United States Patent [19]
Guggi

[11] 3,838,333
[45] Sept. 24, 1974

[54] STABILIZED INVERTER

[76] Inventor: Walter Bernhard Guggi, Im Boden 265, 8172 Niederglatt, Switzerland

[22] Filed: May 21, 1973

[21] Appl. No.: 362,312

[30] Foreign Application Priority Data
May 31, 1972 Switzerland.......................... 8007/72
May 30, 1972 Switzerland.......................... 8006/72
Sept. 13, 1972 Switzerland........................ 13648/72

[52] U.S. Cl............................................. 321/45 R
[51] Int. Cl. ........................................... H02m 7/48
[58] Field of Search .................................. 321/45 R

[56] References Cited
UNITED STATES PATENTS

| | | | |
|---|---|---|---|
| 3,273,076 | 9/1966 | Wilting........................... | 321/45 R X |
| 3,317,816 | 5/1967 | Wilting............................. | 321/45 R |
| 3,334,291 | 8/1967 | Hehenkamp................... | 321/45 R X |
| 3,351,779 | 11/1967 | Hehenkamp....................... | 321/45 R |
| 3,366,866 | 1/1968 | King................................. | 321/45 R X |
| 3,413,539 | 11/1968 | Lopitzsch.......................... | 321/45 R |
| 3,605,003 | 9/1971 | Guggi................................. | 321/45 R |
| 3,671,845 | 6/1972 | Guggi............................ | 321/45 R X |

Primary Examiner—William M. Shoop, Jr.
Attorney, Agent, or Firm—Werner W. Kleeman

[57] ABSTRACT

A stabilized inverter apparatus, capable of transforming direct current into alternating current, and particularly sine-like alternating current with low harmonic content, by means of trigger controlled current valves in conjunction with a double-tuned electrical LC-circuit means with a common capacitor, by feeding direct current from a source thereof through a tuning inductor and current valves, applying chopped direct current with alternating polarities across the terminals of the primary winding of the transformer, which primary winding has a capacitor connected in parallel herewith. The capacitor is in resonance with the reflected inductance of the tuning inductor, the magnitude of reflected inductance of said transformer winding being close to resonance with said capacitor, whereby energy may be drawn from said transformer by connecting a load to a winding thereof.

6 Claims, 1 Drawing Figure

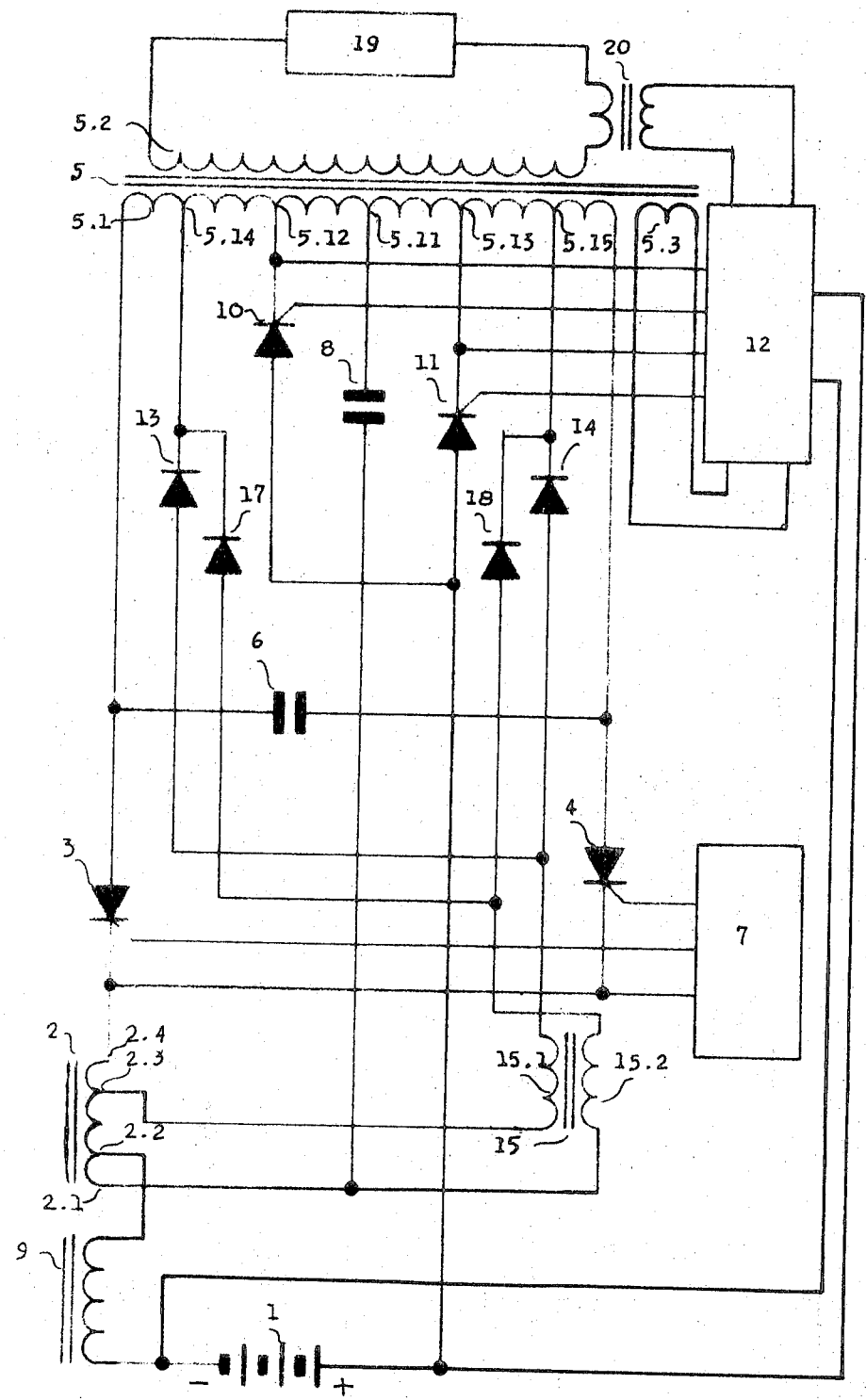

STABILIZED INVERTER

FIELD OF INVENTION

The present invention relates to a new and improved construction of stabilized inverter capable of transforming direct current into sine-like alternating current.

BACKGROUND OF THE PRIOR ART

My U.S. Pat. Nos. 3,671,845, granted June 20, 1972, and 3,605,003, granted Sept. 14, 1971, describe inverters capable of transforming direct current into alternating current, particularly sine-like alternating current, by means of trigger controlled current valves in conjunction with a tuned LC-circuit including a commutating capacitor and a commutating inductor constituting components of the tuned system, by feeding direct current from a source thereof through said commutating inductor and current valves. Chopped direct current of alternating polarity is applied across the outer terminals of the primary winding of an inverter transformer having a capacitor connected in parallel therewith, the capacitance of such capacitor being dimensioned to form a tuned circuit together with the commutating inductor and permitting the drain of energy from a suitable winding of the transformer. The circuit also incorporates passive stabilizing means for the output level by means of feedback arrangements as well as input current control means through trigger controlled valves commutated by alternating current of the inverter transformer.

Notable advantages of the systems described in my aforementioned United States patents are their ability to efficiently transform direct current into controlled sine-like alternating current.

Disadvantages of the systems are the fact that switching transients brought about by the current valves (SCR's) and diodes connected with the inverter transformer affect the wave shape of the output voltage, rendering it necessary to provide additional filtering means for certain applications. Furthermore, the particular arrangement of the passive feedback stabilizing system which includes multiple rectifier diodes can generate relatively high circulating losses, particularly under low load conditions and when operating at low input voltage.

SUMMARY OF THE INVENTION

It is a primary object of the present invention to provide an inverter of simplified design affording high reliability, high efficiency with improved output voltage wave shape, improved performance under transient load conditions and reduced internal losses.

Another object of the invention aims at the provision of an improved stabilized sine wave inverter with a low distortion sine wave output voltage.

Yet a further object of this invention is the provision of an improved inverter system permitting continuous output voltage regulation and stabilization thereof by means of input current control.

An additional object of the present invention is to provide multiphase in inverter systems constructed according to the invention.

Still another object of the invention is to provide dc-dc conversion of the inverter system by rectifying the output current.

Now in order to implement these and still further objects of the invention, which will become more readily apparent as the description proceeds, the invention contemplates extending the tuned circuit principle to a double tuned inverter system with a common tuning capacitor in which the commutating inductor is tuned with the commutating capacitor, and additionally, the inverter transformer or output transducing system is specifically designed to approach resonance with the commutating capacitor. The tuned circuit impedance remains capacitive, the resonance normally occurring at a much lower frequency with this type inverter owing to the relatively high value of the commutating capacitance required in the sine wave inverter and the inherent high value of inductance of the output transformer.

Additionally, the passive feedback stabilizing system is designed to stabilize the output voltage across the inverter transformer by feedback means from the transformer side to the dc-input side of the inverter, and by stabilizing the ac-voltage across the commutating inductor by additional feedback means from the commutating inductor side to the transformer side of the inverter. The feedback means comprises rectifying diodes and a smoothing inductor to avoid wave shape distortion of the output voltage.

Furthermore, there may be provided regulating means in which the input current is controlled in order to regulate the output voltage. The regulating means may employ trigger controlled valves (SCR's) which are commutated by alternating current generated by the inverter.

Considerable improvements in the performance of the system can be attained by utilizing the above-discussed circuit modifications. The improvements which can be realized may be enumerated as follows: lower distortion in the ouput voltage wave shape, extended load transient performance due to the "fly wheel effect" of the tuned output system, higher efficiency, lower idling and low load losses.

BRIEF DESCRIPTION OF THE DRAWING

The invention will be better understood and objects other than those set forth above, will beoome apparent when consideration is given to the following detailed description thereof. Such description makes reference to the annexed drawing wherein the single FIGURE of the drawing illustrates a schematic circuit diagram of a stabilized sine wave inverter embodying the teachings of the invention.

DETAILED DESCRIPTION OF THE PREFERRED EMBODIMENTS

Describing now the circuitry of stabilized inverter depicted in the drawing it will be understood that the negative terminal of a source of dc-potential 1 is connected to one terminal of an inductor 9, the other terminal of which is connected with the terminal 2.2 of a tuning inductor 2. Another terminal 2.4 of the tuning inductor 2 is connected in parallel with the cathodes of SCRs 3 and 4. The respective anodes of these SCRs 3 and 4 are connected to the end terminals of the primary winding 5.1 of an inverter transformer 5 and also to the terminals of a commutating capacitor 6. The trigger electrodes of the SCRs 3 and 4 are connected with a pulse generator 7. This pulse generator 7 is also connected with the cathodes of the SCRs 3 and 4.

The positive terminal of the dc souce 1 is connected in parallel with the anodes of SCRs 10 and 11. The respective cathodes of these SCRs 10 and 11 are connected to respective taps 5.12 and 5.13 symmetrically located with respect to the center tap 5.11 of the primary winding 5.1 of the transformer 5.

The trigger electrodes of the SCRs 10 and 11 are connected with a phase control trigger circuit 12 which is also connected with the cathodes of the SCRs 10 and 11.

The center tap 5.11 of the primary winding 5.1 of the transformer 5 is connected to one terminal of a capacitor 8, the other terminal of which is connected to the terminal 2.1 of the tuning inductor 2.

The cathodes of two pairs of diodes 13, 14 and 17, 18 are connected with respective taps 5.14 and 5.15 symmetrically located with respect to the center tap 5.11 of the primary winding 5.1 of the transformer 5. The anodes of the diodes 13 and 14 are commonly connected to one terminal of winding 15.1 of inductor 15, the other terminal of which is connected to the terminal 2.3 of the tuning inductor 2. The anodes of the diodes 17 and 18 are commonly connected to one terminal of winding 15.2 of the inductor 15, the other terminal of which is connected to terminal 2.1 of the tuning inductor. A load 19 is connected through the primary winding of current transformer 20 across the secondary winding 5.2 of transformer 5.

The phase control trigger circuit 12, in addition to being connected to the winding 5.3 of the transformer 5, is also connected to the secondary winding of the current transformer 20 and to the poles of the dc current source 1.

Direct current derived from the current source 1 is commutated between the SCRs 3 and 4 with the aid of the commutating capacitor 6 and is made available to the user or load across the secondary winding 5.2 of the transformer 5 by the resonance effect of the inductor 2 together with the commutating capacitor 6. These two components are alternately connected through opposite current valves of the primary winding 5.1 of the transformer 5. By virtue of the simultaneous resonance effect of the capacitor 6 with inductor 2 and with the primary winding 5.1 of the transformer 5 which is designed to reflect an inductance of proper value for such resonance there is generated across the output terminals of the inverter a sine-like alternating current of high quality and high stability.

The inverter system is primarily stabilized against load change disturbances by means of energy exchange between the inverter output side and its dc input side as well as between its ac output side and its tuning inductor side by means of appropriate networks connected between the taps 5.14 and 5.15 of the primary winding 5.1 of the transformer 5 and the taps 2.1 and 2.3 of the tuning inductor 2. The interconnections include the diodes 13, 14, 17 and 18 as well as the inductor 15. Current exchange is generated by rectified sine wave pulses from the transformer primary winding and by pulses generated during the commutating cycle across the tuning inductor 2. These pulses are located spaced apart approximately 90° and they generate a steady current flow which is maintained by the inductor 15, so that the magnitude of the current depends upon the loading of inverter. In this way there is ensured that the stored energy is rapidly exchanged in the event of load change and that the output voltage remains proportional to the input voltage throughout the operating range of the system.

In order to automatically compensate for voltage changes of the direct current source 1 and for variations of voltage drop due to internal losses, the energy flow from the dc-side is controlled by means of the phase cntrolled rectifiers connected to the taps 5.12 and 5.13 of the primary winding 5.1 of the transformer 5, to thereby provide commutation between the SCRs 10 and 11 in the dc-input circuit by means of the ac-component present at the taps 5.12 and 5.13 of the transformer winding 5.1. The primary current flow within the inverter circuit is thus divided into two components which include a pure alternating current which flows from the center tap 5.11 through the capacitor 8 back to the tuning inductor 2 and a second component which includes chopped direct current flowing through the SCRs 10 and 11 through the dc-current source 1 and the inductor 9 back to the tuning inductor 2. The magnitude of the last-mentioned current is regulated as a function of the phase angle triggering adjustment of the SCRs 10 and 11 with respect to the triggering pulse location at the SCRs 3 and 4. This regulation results in a dc potential appearing across the capacitor 8 which is essentially proportional to the ac-output voltage.

While the particular arrangement portrays a scheme for maintaining constant output voltage by feeding output voltage and output current information as well as input voltage information to the regulating trigger circuit, it is equally possible to provide other regulating functions.

While a specific embodiment of the invention has been shown and described in detail in order to illustrate the application of the principles of the invention, it should be understood that the invention may be otherwise embodied without departing from such principles, it being particularly possible to rearrange certain of the circuit components or to embody the principles described in so-called bridge type inverter circuits or multi-phase inverter arrangements. For instance, the inductor 15 could also be connected in circuit across the taps 5.12 and 5.15 of the primary winding 5.1 of the transformer 5.

While there is shown and described present preferred embodiments of the invention, it is to be distinctly understood that the invention is not limited thereto but may be otherwise variously embodied and practiced within the scope of the following claims.

Accordingly, what is claimed is:

1. A stabilized inverter apparatus, capable of transforming direct current into alternating current, and particularly sine-like alternating current with low harmonic content, by means of trigger controlled current valves in conjunction with double-tuned electrical LC-circuit means including two tuned electrical circuits having a common capacitor, by feeding direct current from a source threof through a tuning inductor and current valves, applying chopped direct current with alternating polarities across the terminals of the primary winding of a transformer, said primary winding having a capacitor defining said common capacitor connected in parallel threwith, said capacitor being in resonance with the reflected inductance of said tuning inductor, said capacitor and said tuning inductor forming one of said tuned electrical circuits, said capacitor and said transformer winding forming the other of said tuned electrical circuits, the magnitude of the inductance of said transformer winding effective across said capacitor together with the capacitance of said capacitor increasing the eesonance frequency of the tuned circuit constituted by said transformer winding and said capacitor, in order to approach the operating frequency of the inverter.

2. A stabilized inverter apparatus, capable of transforming direct current into alternating current, and particularly sine-like alternating current with low harmonic content, by means of trigger controlled current valves in conjunction with double-tuned electrical LC-circuit means including two tuned electrical circuits having a common capacitor, by feeding direct current from a source thereof through a tuning inductor and current valves, applying chopped direct current with alternating polarities across the terminals of the primary winding of a transformer, said primary winding having a capacitor defining said common capacitor connected in parallel therewith, said capacitor being in resonance with the reflected inductance of said tuning inductor, said capacitor and said tuning inductor forming one of said tuned electrical circuits, said capacitor and said transformer winding forming the other of said tuned electrical circuits, the magnitude of reflected inductance of said transformer winding being close to resonance with said capacitor, whreby energy may be drawn from said transformer by connecting a load to a winding thereof, and stabilizing means for stabilizing the inverter apparatus by energy exchange between said transformer and the dc input side of the inverter as well as said tuning inductor and said transformer, said inverter apparatus further comprising, in combination, an input connection between one terminal of said dc source and phase controlled current valves with respective connections to taps of said transformer winding located symmetrically to a center tap providing controlled energy flow means and feeding controlled dc current to said connections.

3. A stabilized inverter apparatus as claimed in claim 2, including a second capacitor coupled with the center tap of the transformer for effecting separation of ac and dc components in said input connection and providing free ac current flow between said center tap and said tuning inductor, and phase angle control means connected to said phase controlled current valves and operable to effect application of a variable magnitude change of potential of remaining polarity to said second capacitor as a function of the setting of said control means, said potential being higher or lower in relation to the input potential in accordance with the status of the latter and being essentially proportional to the magnitude of the ac output voltage.

4. A stabilized inverter apparatus, as claimed in claim 3, including output transducing means incorporating said transformer winding tuned with said commutating capacitor.

5. A stabilized inverter apparatus, as claimed in claim 4, wherein said stabilizing means comprises controlled energy exchange means.

6. A stabilized inverter appratus, as claimed in claim 5, including a junction point connected to a terminal of said tuning inductor, said second capacitor being connected between said junction point and said center tap of said winding of the transformer, and an inductor having one terminal connected to a junction point of said tuning inductor and its opposite terminal connected to a terminal of said dc source.

* * * * *